United States Patent
Kakizawa

[11] Patent Number: 6,094,563
[45] Date of Patent: *Jul. 25, 2000

[54] COMMUNICATION APPARATUS

[75] Inventor: Katsuhiro Kakizawa, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/720,774

[22] Filed: Oct. 3, 1996

[30] Foreign Application Priority Data

Oct. 9, 1995 [JP] Japan ................................. 7-286370

[51] Int. Cl.⁷ ............................................. H04B 1/38
[52] U.S. Cl. ................................... 455/69; 455/522
[58] Field of Search ...................... 455/68, 69, 70, 455/517, 522, 575, 91, 115, 126, 127, 67.1, 67.7

[56] References Cited

U.S. PATENT DOCUMENTS

| | | |
|---|---|---|
| 4,958,359 | 9/1990 | Kato . |
| 5,003,619 | 3/1991 | Morris et al. .............................. 455/69 |
| 5,168,516 | 12/1992 | Ito ............................................. 455/70 |
| 5,487,185 | 1/1996 | Halonen ................................. 455/115 |
| 5,524,287 | 6/1996 | Yokoya et al. ........................... 455/69 |

*Primary Examiner*—Thanh Cong Le
*Attorney, Agent, or Firm*—Morgan & Finnegan, LLP

[57] ABSTRACT

A communication apparatus including a plurality of transmitting unit for transmitting signals at high or low power, and setting unit for setting alteration patterns of transmission power of the plurality of transmitting unit.

24 Claims, 2 Drawing Sheets

COMMUNICATION APPARATUS

BACKGROUND OF THE INVENTION

1. Field of the Invention

This invention relates to a communication apparatus in which transmission power is capable of being changed.

2. Description of the Related Art

A wireless communication unit is so designed as to maximize the transmission power between a master and slave machine in such a manner that the range of transmission capability is made as large as possible. Owing to problems such as intermodulation of radio waves, however, the number of wireless communication units capable of being accommodated by a single system is limited to one or two. Further, in a case where a plurality of wireless communication units are installed, it is required that the locations at which the masters are installed, as well as the locations at which the slaves are installed, be separated from each other in excess of a fixed distance. Thus, there are limiting conditions in terms of use.

SUMMARY OF THE INVENTION

An object of the present invention is to optimize transmission power.

Another object of the present invention is to enhance multiplexing.

Another object of the present invention is to reduce noise.

Another object of the present invention is to improve operability in terms of setting transmission power.

Another object of the present invention is to optimize transmission power in dependence upon the type of apparatus.

Other, objects, features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the invention will now be described with reference to the drawings.

Figure 1:
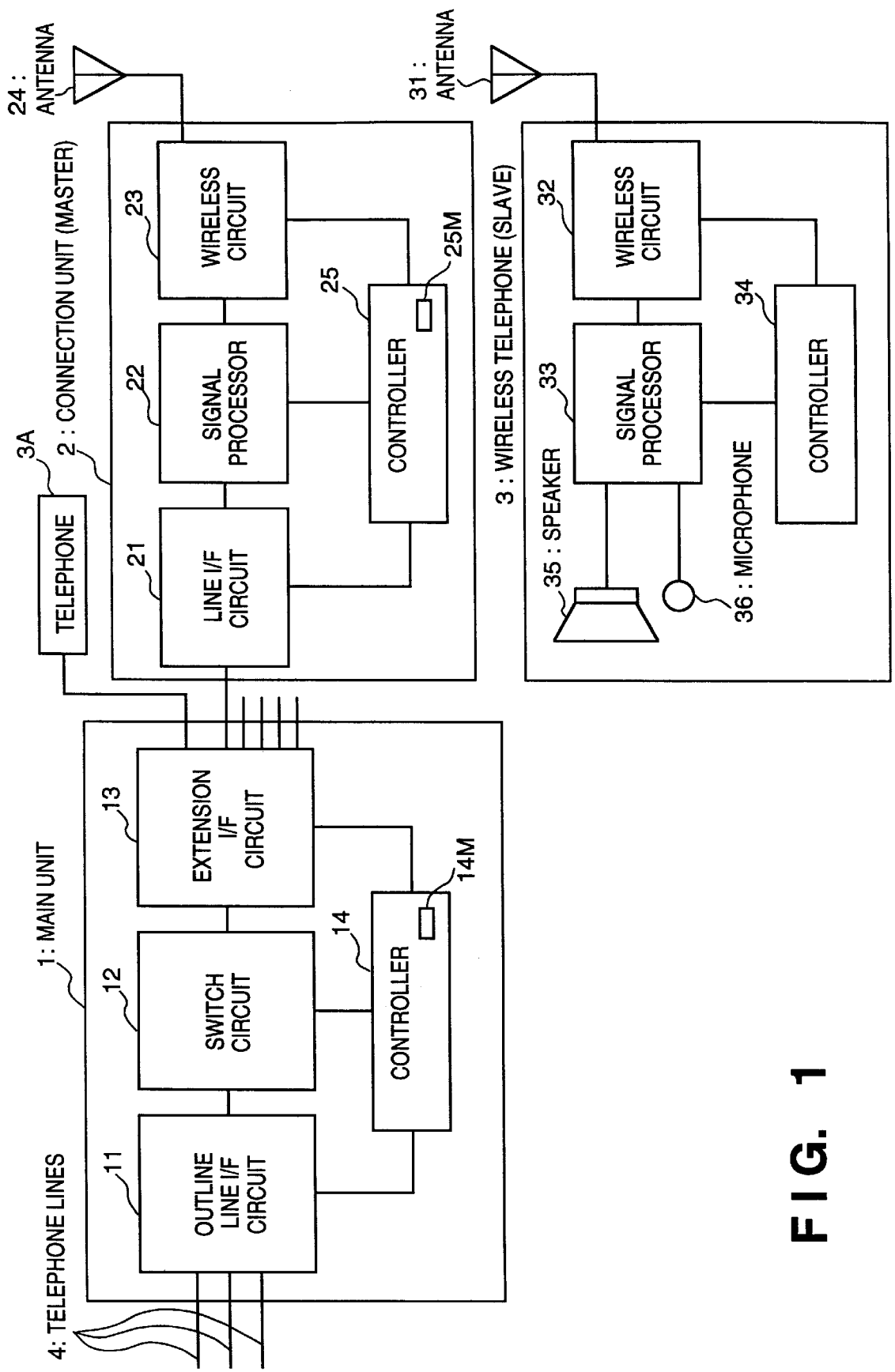
FIG. 1 is a block diagram illustrating the configuration of a wireless communication system according an embodiment of the present invention.
Figure 2:
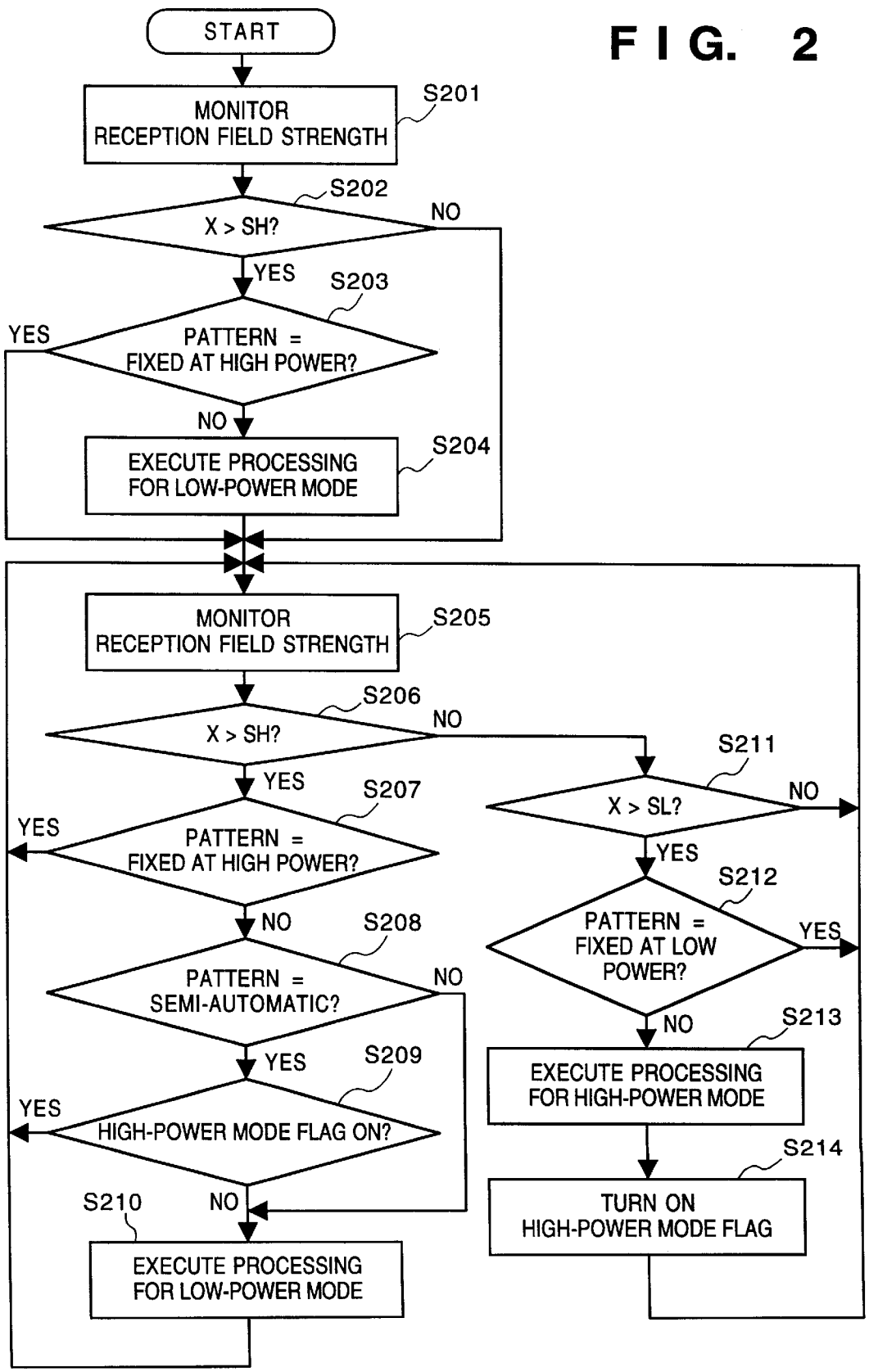
FIG. 2 is a flowchart illustrating a procedure for controlling the operation of a wireless communication system according an embodiment of the present invention.

FIGS. 1 and 2 illustrate a first embodiment of the invention, in which FIG. 1 is a block diagram illustrating the configuration of a wireless communication system according the first embodiment of the present invention. As shown in FIG. 1, the wireless communication system comprises a main unit 1, a connection unit (master) 2 and a wireless telephone (slave) 3.

Though only one connection unit 2 and one wireless telephone 3, which constitute one set, are shown in FIG. 1, a plurality of sets each composed of the connection unit 2 and wireless telephone 3 can be connected to an extension interface (i/f) circuit 13.

The main unit 1 has an outside line i/f circuit 11 for interfacing telephone lines 4, a switch circuit 12 for connecting a channel, the above-mentioned extension i/f circuit 13 for interfacing extension terminals, and a controller 14 for overall control of the main unit 1.

The connection unit 2 sends control information and the like from the main unit to the extension wireless telephone 3 and sends control information and the like from the wireless telephone 3 to the main unit 1. The connection unit 2 has a line i/f circuit 21 for controlling communication with the main unit, a signal processor 22 for performing a signal conversion between wired and wireless signals, a wireless circuit 23 for sending and receiving wireless signals, an antenna 24 and a controller 25 for performing overall control of the connection unit 2. The wireless circuit 23 selects the strength of transmission power in response to a command from the controller 25.

The wireless telephone 3 has an antenna 31 for wireless transmission and reception, a wireless circuit 32, a signal processor 33 for performing a conversion between wireless and voice signals, a controller 34 for overall control of the wireless telephone 3, a speaker 35 for listening to the voice of a communicating party, and a microphone 36 for entering a voice on the originating side. The wireless circuit 32 selects the strength of transmission power in response to a command from the controller 34.

In the arrangement described above, an operation for originating a call, such as by taking the receiver off the hook, is performed at the wireless telephone 3, and a request for call origination is sent from the controller 34 to the connection unit 2 via the wireless circuit 32 and antenna 31. If the connection unit 2 receives and recognizes radio waves having its own address via the antenna 24 and wireless circuit 23, the controller 25 recognizes the call origination request from the wireless telephone 3 via the signal processor 22. After a wireless link has been established between the connection unit 2 and wireless telephone 3, the main unit 1 is notified of the origination request via the line i/f circuit 21. In the main unit 1 the controller 14 receives the origination request from the connection unit 2 and sends alteration pattern information (transmission power information), which is stored in a memory 14M and conforms to the accommodating location of the requesting party, to the connection unit 2 via the extension i/f circuit 13. The alteration pattern information is registered in the memory 14M from a telephone 3A or from an operating panel (not shown) provided in the main unit 1. Upon receiving the alteration pattern information via the line i/f circuit 21, the controller 25 stores this information in a memory 25M and executes processing to monitor the status of the wireless link.

Next, reference will be had to FIG. 2 to describe the processing executed when the controller 25, which has received the alteration pattern information via the line i/f circuit 21, monitors the status of the wireless link. FIG. 2 is a flowchart illustrating the control procedure of the processing performed when the controller 25, which has received the alteration pattern information via the line i/f circuit 21, monitors the status of the wireless link.

Before the wireless link is established, the connection unit 2 and wireless telephone 3 both deliver high transmission power. In addition, a high-power mode flag is turned off.

First, when a wireless link has been established, the controller 25 samples and monitors the value X of reception field strength sensed by the wireless circuit 23 (step S201). Next, the controller 25 determines whether X has exceeded a threshold value (SH), which is for the purpose of establishing the low-power mode (step S202). If the decision rendered is "YES", then the program proceeds to step S203, at which the controller 25 determines whether the alteration pattern is indicative of a fixed high-power mode. If the alteration pattern is not indicative of the fixed high-power mode, then the controller 25 executes processing for the low-power mode (step S204) and the program then proceeds to step S205. Processing for the low-power mode involves sending a control signal to the wireless telephone 3 via the wireless link so as to establish the low-power mode. Upon receiving this control signal, the wireless telephone 3 weakens the transmission power of the wireless circuit 32 (establishes the low-power state) in response to a command from the controller 34. The controller 25 weakens (places in the low-power state) the transmission power of the wireless circuit 23 as well.

If it is found at step S202 that X does not exceed SH or if it is found at step S203 that the alteration pattern is indicative of the fixed high-power mode, the call is established in the high-power state and the program proceeds to step S205. Here the controller 25 samples and monitors the value X of reception field strength from the wireless circuit 23 in the same manner as at step S201.

In accordance with steps S201~S204, therefore, if the mode is other than the fixed high-power mode, the wireless circuits 23 and 32 control their transmission powers in the low-power mode or high-power mode, depending upon the reception field strength when the wireless link is established.

Next, while the call is in progress, the controller 25 determines whether X has exceeded the threshold value (SH), which is for the purpose of establishing the low-power mode (step S206). This is similar to step S202 above. If the decision rendered is "YES", then the program proceeds to step S207, at which the controller 25 determines whether the alteration pattern is indicative of a fixed high-power mode. This is similar to step S203 above. If the alteration pattern is not indicative of the fixed high-power mode, then the controller 25 determines whether the alteration pattern is indicative of the semi-automatic mode (step S208). If the alteration pattern is indicative of the semi-automatic mode, then the controller 25 determines whether the high-power mode flag is ON (step S209). If the high-power mode flag is not ON, then the controller 25 executes processing for the low-power mode (step S210). The program thenceforth returns to step S205.

If it is found at step S206 that X does not exceed SH, then the controller 25 determines whether X is less than a threshold value (SL) that is for the purpose of establishing the high-power mode (step S211). If X is less than SL, the controller 25 determines whether the alteration pattern is indicative of a fixed low-power mode (step S213). If the alteration pattern is not indicative of the fixed low-power mode, then the controller 25 executes processing for the high-power mode (step S213) and turns on the high-power mode flag (step S214). The program thenceforth returns to step S205.

Processing for the high-power mode involves sending a control signal to the wireless telephone 3 via the wireless link so as to establish the high-power mode. Upon receiving this control signal, the wireless telephone 3 strengthens the transmission power of the wireless circuit 32 (establishes the high-power state) in response to a command from the controller 34. The controller 25 strengthens (places in the high-power state) the transmission power of the wireless circuit 23 as well.

If it is found at step S211 that X is greater than SL or if it is found at step S212 that the alteration pattern is indicative of the fixed lower-power mode, then the program returns to step S205.

When the control signal in processing for the low-power mode and in processing for the high-power mode is sent from the connection unit 2 to the wireless telephone 3, the signal emerges from the speaker 35 in the form of noise. With a view to preventing mutual interference between radio waves, it is desired that transmission power be changed at an appropriate time in conformity with the reception field strength. However, the production of noise during a call is not desirable. Here the semi-automatic mode is effective.

A second embodiment of the invention will now be described. It should be noted that the basic configuration of the wireless communication system of this embodiment is the same as that depicted in FIG. 1.

In this embodiment, the controller 14 of the main unit 1 discriminates the type of telephone with regard to each location at which telephones are accommodated. By way of example, this discriminating operation is carried out by registering the type of telephone, with regard to each location at which one is installed, in memory 14M by using the telephone 3A or the operating panel (not shown) provided on the main unit 1, and referring to the types of telephone registered. The controller 14 sets the alteration pattern to the automatic mode with regard to a desktop extension telephone (a telephone whose operating panel is provided on the connection unit 2 and not on the wireless telephone 3) the state of whose radio waves usually are comparatively stable. With regard to a portable extension telephone (a telephone whose operating panel is provided on the wireless telephone 3 and not on the connection unit 2) that is moved from location to location, the controller 14 sets the alteration pattern to the semi-automatic mode for the purpose of reducing the frequency with which noise is produced during a call.

A third embodiment of the invention will now be described. It should be noted that the basic configuration of the wireless communication system of this embodiment is the same as that depicted in FIG. 1.

In this embodiment, the fixed high-power mode or fixed low-power mode is set manually in conformity with the distance between the connection unit 2 and wireless telephone 3 in a case where a desktop extension telephone is installed by a serviceman where a person will not pass between the connection unit 2 and wireless telephone 3. If the setting is made in this way, noise generated by the control signal during a call owing can be completely suppressed.

Further, the semi-automatic mode may be set manually on the desktop extension telephone as well. If this is done, the user himself can change the location of installation, with minimal occurrence of noise, without taking into account the positional relationship between connection units 2 or between wireless telephones 3.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus comprising:
   a plurality of transmitting means; and
   setting means for setting transmission modes of said plurality of transmitting means from a low power fixed mode, a high power fixed mode and a variable power mode.

wherein a transmission power is fixed in a low power in the low power fixed mode, the transmission is fixed in a high power in the high power fixed mode, and the transmission power is variable in the variable power mode between the low power and the high power in accordance with a reception state.

2. The apparatus according to claim 1, wherein the variable power mode includes a limited variable power mode which, after the transmission power has been changed from the low power to the high power, limits a change back to the low power from the high power.

3. The apparatus according to claim 1, wherein said plurality of transmitting means comprise a plurality of transmitting means of different types, and said setting means sets the transmission modes predetermined in dependence upon the type of transmitting means.

4. The apparatus according to claim 1, wherein said plurality of transmitting means comprises fixed transmitting means and movable transmitting means, and said setting means sets the transmission modes predetermined in dependence upon whether the transmitting means is fixed or movable.

5. The apparatus according to claim 1, wherein after the transmission power has been changed from the low power to the high power, said setting means sets fixed transmitting means to a limited variable power mode which limits a change back to the low power from the high power and sets movable transmitting means to a non-limited variable power mode which does not limit a change back to the low power from the high power.

6. The apparatus according to claim 1, wherein the reception state includes a reception level.

7. A method of controlling transmission power of a plurality of transmitting means in a communication apparatus having said plurality of transmitting means, comprising the steps of:

storing transmission modes of said plurality of transmitting means from a low power fixed mode, a high power fixed mode and a variable power mode; and setting the transmission modes of said plurality of transmitting means, wherein a transmission power is fixed in a low power in the low power fixed mode, the transmission power is fixed in high power in the high power fixed mode, and the transmission power is variable in the variable power mode between the low power and the high power in accordance with a reception state.

8. The method according to claim 7, wherein the variable power mode includes a limited variable power mode which, after the transmission power has been changed from the low power to the high power, limits a change back to the low power from the high power.

9. The method according to claim 7, wherein the transmission modes predetermined in dependence upon types of the plurality of transmitting means is set in said setting step.

10. The method according to claim 7, wherein the transmission modes predetermined in dependence upon whether the transmitting means is fixed or movable is set in said setting step.

11. The method according to claim 7, wherein after the transmission power has been changed from the low power to the high power, fixed transmitting means is controlled in a limited variable power mode which limits a change back to the low power from the high power, and movable transmitting means is controlled in a non-limited variable power mode which does not limit a change back to the low power from the high power.

12. The method according to claim 7, wherein the transmission mode is set in said setting step in accordance with the reception state.

13. The method according to claim 12, wherein the reception state includes a reception level.

14. A communication apparatus comprising:

connecting means for connecting a plurality of apparatuses;

memory means for storing a type for each of the plurality of apparatuses;

receiving means for receiving a signal from a partner; and altering means for altering transmission power of the partner for transmitting the signal in dependence upon whether the partner is a fixed type or a movable type based on said memory means.

15. The apparatus according to claim 14, wherein after the transmission power has been changed from a low power to a high power, said altering means permits a change back to the low power from the high power in a case where the apparatus is movable, and limits the change back to the low power from the high power in a case where the apparatus is fixed.

16. The apparatus according to claim 14, further comprising a plurality of transmitting means.

17. The apparatus according to claim 16, wherein said altering means alters the transmission power of the plurality of transmitting means.

18. The apparatus according to claim 14, wherein said altering means alters the transmission power in accordance with a reception state.

19. The apparatus according to claim 18, wherein the reception state includes a reception level.

20. A method for controlling transmission power of a communication apparatus connecting a plurality of apparatuses and having a memory for storing a type for each of the plurality of apparatuses, comprising the steps of:

receiving a signal from a partner;

judging whether the partner is a fixed type or a movable type based on the memory; and controlling the transmission power of the partner for transmitting the signal in accordance with a judging result in said judging step.

21. The method according to claim 20, wherein after the transmission power has been changed from a low power to a high power, a change back to the low power from the high power is permitted in a case where the apparatus is movable, and the change back to the low power from the high power is limited in a case where the apparatus is fixed.

22. The method according to claim 20, wherein the transmission power of a plurality of transmitting means included in the apparatus is controlled.

23. The method according to claim 20, wherein the transmission power is controlled in accordance with a reception state and the judging result.

24. The method according to claim 20, wherein the reception state includes a reception level.

* * * * *

UNITED STATES PATENT AND TRADEMARK OFFICE
CERTIFICATE OF CORRECTION

PATENT NO. : 6,094,563
DATED : July 25, 2000
INVENTOR(S) : Katsuhiro Kakizawa

Page 1 of 1

It is certified that error appears in the above-identified patent and that said Letters Patent is hereby corrected as shown below:

Column 4, claim 1,
Line 67, "mode." should read -- mode, --.

Column 5, claim 1,
Line 2, "transmission is fixed" should read -- transmission power is fixed --.

Signed and Sealed this

Twenty-sixth Day of February, 2002

Attest:

JAMES E. ROGAN
*Attesting Officer*  *Director of the United States Patent and Trademark Office*